United States Patent
Okura et al.

(10) Patent No.: US 9,574,418 B2
(45) Date of Patent: Feb. 21, 2017

(54) DOWNHOLE TOOL MEMBER FOR HYDROCARBON RESOURCE RECOVERY

(71) Applicant: Kureha Corporation, Tokyo (JP)

(72) Inventors: Masayuki Okura, Tokyo (JP); Hikaru Saijo, Tokyo (JP); Katsumi Yoshida, Tokyo (JP); Hiroyuki Sato, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 14/398,628

(22) PCT Filed: Mar. 13, 2013

(86) PCT No.: PCT/JP2013/057054
§ 371 (c)(1),
(2) Date: Nov. 3, 2014

(87) PCT Pub. No.: WO2014/010267
PCT Pub. Date: Jan. 16, 2014

(65) Prior Publication Data
US 2015/0292292 A1    Oct. 15, 2015

(30) Foreign Application Priority Data
Jul. 10, 2012    (JP) .................................. 2012-154947

(51) Int. Cl.
E21B 33/12    (2006.01)
C08K 7/06    (2006.01)
(Continued)

(52) U.S. Cl.
CPC .................. *E21B 33/12* (2013.01); *C08K 7/02* (2013.01); *C08K 7/06* (2013.01); *C08K 7/14* (2013.01);
(Continued)

(58) Field of Classification Search
CPC .................................................... E21B 43/267
See application file for complete search history.

(56) References Cited

U.S. PATENT DOCUMENTS 7,093,664 B2    8/2006    Todd et al.
7,353,879 B2    4/2008    Todd et al.
(Continued)

FOREIGN PATENT DOCUMENTS

CN    101351523 A    1/2009
CN    101371005 A    2/2009
(Continued)

OTHER PUBLICATIONS

International Search Report of PCT/JP2013/057054 dated Jun. 18, 2013.
(Continued)

*Primary Examiner* — Robert E Fuller
(74) *Attorney, Agent, or Firm* — Oliff PLC (57) ABSTRACT

A downhole tool member for hydrocarbon resource recovery, comprising a shaped body of a polyglycolic acid resin blended with an inorganic or organic short fiber reinforcement material, and having thickness reduction rate characteristics when held in water at 120° C., inclusive of: an initial thickness reduction rate (as an average for a holding period for 4 hours) which is at most 0.8 times that of a shaped body of the polyglycolic acid resin alone, and has a terminal thickness reduction rate (after the thickness decreases to 50% or less of an initial thickness) which is larger than 1.5 times the initial thickness reduction rate.

14 Claims, 3 Drawing Sheets

(51) Int. Cl.
*C08K 7/14* (2006.01)
*C09K 8/88* (2006.01)
*C08K 7/02* (2006.01)
*C08K 9/08* (2006.01)

(52) U.S. Cl.
CPC . *C08K 9/08* (2013.01); *C09K 8/88* (2013.01); *C08K 2201/003* (2013.01); *C08K 2201/016* (2013.01)

(56) References Cited

U.S. PATENT DOCUMENTS

| | | | |
|---|---|---|---|
| 7,621,336 | B2 | 11/2009 | Badalamenti et al. |
| 7,762,342 | B2 | 7/2010 | Richard et al. |
| 7,775,278 | B2 | 8/2010 | Willberg et al. |
| 8,066,068 | B2 | 11/2011 | Lesko et al. |
| 8,714,250 | B2 | 5/2014 | Baser et al. |
| 2006/0042797 | A1 | 3/2006 | Fredd et al. |
| 2006/0113077 | A1 | 6/2006 | Willberg et al. |
| 2006/0283591 | A1 | 12/2006 | Willberg et al. |
| 2007/0261847 | A1 | 11/2007 | Saltel |
| 2007/0289743 | A1 | 12/2007 | Willberg et al. |
| 2008/0200352 | A1 | 8/2008 | Willberg et al. |
| 2008/0236823 | A1 | 10/2008 | Willberg et al. |
| 2008/0289823 | A1 | 11/2008 | Willberg et al. |
| 2009/0044945 | A1 | 2/2009 | Willberg et al. |
| 2009/0078408 | A1 | 3/2009 | Richard et al. |
| 2009/0133868 | A1 | 5/2009 | Sullivan et al. |
| 2009/0286700 | A1 | 11/2009 | Lesko et al. |
| 2010/0263870 | A1 | 10/2010 | Willberg et al. |
| 2010/0276150 | A1 | 11/2010 | Sullivan et al. |
| 2010/0319919 | A1 | 12/2010 | Bustos et al. |
| 2011/0056684 | A1 | 3/2011 | Willberg et al. |
| 2011/0284213 | A1 | 11/2011 | Willberg |
| 2012/0125618 | A1 | 5/2012 | Willberg et al. |
| 2012/0129737 | A1* | 5/2012 | Lesko .................. C09K 8/665 507/211 |
| 2012/0157358 | A1* | 6/2012 | Fang ..................... E21B 43/267 507/269 |
| 2012/0267103 | A1 | 10/2012 | Willberg et al. |
| 2012/0285695 | A1* | 11/2012 | Lafferty ................. C09K 8/03 166/310 |

FOREIGN PATENT DOCUMENTS

| | | |
|---|---|---|
| CN | 101903616 A | 12/2010 |
| EA | 201070658 A1 | 2/2011 |
| JP | 2008-088364 A | 4/2008 |
| JP | 2012-012560 A | 1/2012 |
| RU | 2330931 C2 | 8/2008 |
| RU | 2389864 C2 | 5/2010 |

OTHER PUBLICATIONS

Aug. 23, 2016 Office Action issued in Chinese Application No. 201380021854.1.

May 31, 2016 Office Action issued in Chinese Application No. 201380021854.1.

Nov. 8, 2016 Office Action issued in Japanese Patent Application No. 2014-524661.

* cited by examiner

DOWNHOLE TOOL MEMBER FOR HYDROCARBON RESOURCE RECOVERY

TECHNICAL FIELD

The present invention relates to a member which forms a tool per se or a component thereof for formation or repair of downholes for recovery of hydrocarbon resources including oil and gas.

BACKGROUND ART

Downholes (underground drilling pits) are prepared for recovery of hydrocarbon resources including oil and gas (representatively called "oil" sometimes hereafter) from the underground, and tools for the formation or repair of the downholes, such as frac plugs (disintegratable plugs), bridge plugs, cement retainers, perforation guns, ball sealers, sealing plugs and packers (inclusively referred to as "downhole tools" hereafter), are used and thereafter disintegrated or allowed to fall down without recovery thereof onto the ground as they are in many cases. (Examples of such downhole tools and manners of use thereof are illustrated in, e.g., Patent documents 1-5). Therefore, about the tool of such temporary use, it has been recommended to form the whole or a component thereof constituting a bonding part allowing collapse (i.e. downhole tool member) with a degradable polymer. Examples of such a degradable polymer may include: polysaccharide, such as starch or dextrin; animal albumin polymers, such as chitin and chitosan; aliphatic polyesters, such as polylactic acid (PLA, typically poly L-lactic acid (PLLA)), polyglycolic acid (PGA), polybutyric acid, and polyvaleric acid; and further, polyamino acids, polyethylene oxide, etc. (Patent documents 1 and 2). However, the technology of designing the mechanical strength and time to collapse of such a downhole tool member by using such a degradable polymer has not satisfactorily developed. This is because it was difficult to accurately evaluate the degradation behavior of the degradable polymer.

PRIOR ART DOCUMENTS

Patent Documents

[Patent document 1] US2005/0205266A,
[Patent document 2] US2005/0205265A,
[Patent document 3] US2009/0101334A,
[Patent document 4] U.S. Pat. No. 7,621,336B,
[Patent document 5] U.S. Pat. No. 7,762,342B.

SUMMARY OF INVENTION

Problem to be Solved by the Invention

In view of the above-mentioned conventional state of art, a principal object of the present invention is to provide a downhole tool member which allows more accurate designing of degradation characteristics through suitable selection and shaping of a degradable polymer composition.

Means for Solving the Problems

The downhole tool member for hydrocarbon resource recovery of the present invention, comprises a shaped body of a polyglycolic acid resin blended with an inorganic or organic short fiber reinforcement material, and has thickness reduction rate characteristics when held in water at 120° C., inclusive of: an initial thickness reduction rate (as an average for a holding period for 4 hours) which is at most 0.8 times that of a shaped body of the polyglycolic acid resin alone, and has a terminal thickness reduction rate (after the thickness decreases to 50% or less of an initial thickness) which is larger than 1.5 times the initial thickness reduction rate.

Figure 1:
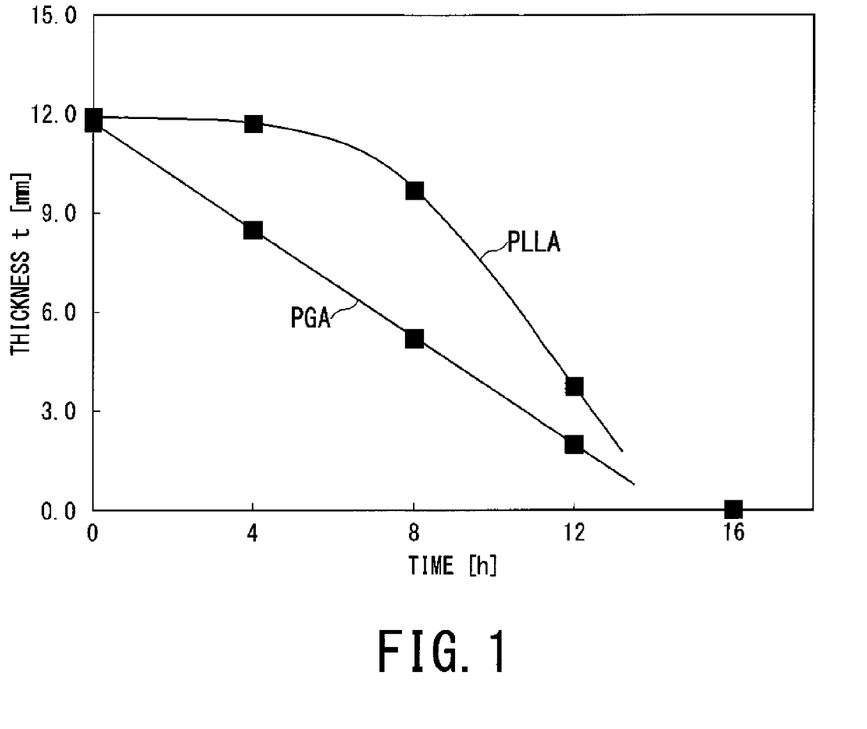
FIG. 1 is a graph showing thickness change with time of during in-water decomposition test at 149° C. of a PGA shaped body and a PLLA shaped body in comparison.

A brief description will be made about a history through which the present inventor has studied with the above mentioned object to arrive at the present invention. As a result of study of the present inventors, aliphatic polyester resins generally show in-water degradability which is generally suitable for forming downhole tool members among which, however, polyglycolic acid (PGA) shows a peculiar in-water degradation characteristic which differs notably from those of other aliphatic polyester resins as shown in FIG. 1 (thickness reduction data in water at 149° C.) in contrast with polylactic acid (PLLA) as a representative example of aliphatic polyester resins. More specifically, it shows a constant thickness reduction rate characteristic (in other words, linear thickness reduction rate) with time in water. Therefore, if an effective thickness which contributes to required characteristics, such as the strength to be maintained and the plugging or sealing performance of a downhole tool member, is appropriately set depending on the time up to collapse of the component concerned, it becomes possible to design the strength and retention time of the downhole tool member. Based on this finding, the present inventors have already proposed a downhole tool member for hydrocarbon resource recovery, comprising a shaped body of a polyglycolic acid resin having a weight-average molecular weight of at least 70,000, having an effective thickness which is ½ or more of a critical thickness of surface decomposition, and exhibiting a thickness reduction rate (velocity) in water which is constant with respect to time. (WO2013/183363A). However, downhole tool members may be used in various manners depending on which collapse characteristics demanded therefor can also vary, and while the above-mentioned linear thickness reduction characteristic of polyglycolic acid resin is very useful for the design of collapse time, it may be desirable to reduce the rate of decay in some cases. Particularly, for use as a packing or sealing member, it is desirable in many cases that the downhole tool member shows a suppressed deformability for finite working hours and collapses quickly after the operation. As a result of further study of the present inventors, it has been further discovered that a shaped body formed of a polyglycolic acid resin blended with an inorganic or organic short fiber reinforcement material shows not only a simply improved strength but also desirable degradation characteristics such that the in-water thickness reduction rate is initially suppressed remarkably but the terminal thickness reduction rate after the thickness has been reduced over a certain degree becomes very fast, and that the suppression period of initial thickness reduction rate can be controlled by the aspect ratio (i.e., ratio of length to diameter (L/D)) of the short fiber reinforcement material to be blended. The downhole tool member for hydrocarbon resource recovery of the present invention has been obtained based on such findings.

BEST MODE FOR PRACTICING THE INVENTION

Hereinafter, the present invention will be described in detail with reference to preferred embodiments thereof.

(Polyglycolic Acid Resin)

The downhole tool member of the present invention comprises a shaped body of a polyglycolic acid resin blended with an inorganic or organic short fiber reinforcement material. A polyglycolic acid resin is particularly preferably used because it has excellent initial strengths as represented by its compression strength, which is at the highest level among thermoplastic resins, and also a large effect of suppressing in-water thickness reduction rate by incorporation of a short fiber reinforcement material. Polyglycolic acid resin used in the present invention may include glycolic acid homopolymer (namely, polyglycolic acid (PGA)) consisting only of a glycolic acid unit (—OCH$_2$—CO—) as a recurring unit, and also a glycolic acid copolymer which includes other monomer (comonomer) units, such as hydroxyl carboxylic acid units, preferably lactic acid units, in a proportion of at most 50 wt. %, preferably at most 30 wt. %, further preferably at most 10 wt. %. The hydrolysis rate, crystallinity, etc., of polyglycolic acid resin can be modified to some extent by converting it into a copolymer including another monomer unit.

Polyglycolic acid resin having a weight-average molecular weight (Mw) of at least 70,000, preferably 70,000-500, 000, is used. If the weight-average molecular weight is below 70,000, the initial strength characteristics required of a tool member is impaired. On the other hand, if the weight-average molecular weight exceeds 500,000, the polyglycolic acid resin is liable to have undesirably inferior molding and processing characteristics.

In order to obtain polyglycolic acid resin of such a large molecular weight, rather than polymerization of glycolic acid, it is preferred to adopt a process of subjecting glycolide which is a dimer of glycolic acid to ring-opening polymerization in the presence of a small amount of catalyst (cation catalyst, such as organo-tin carboxylate, tin halide, or antimony halide) and substantially in the absence of a solvent (namely, under bulk polymerization conditions) under heating at temperatures of about 120-250° C. Accordingly, in case of forming a copolymer, it is preferred to use as a comonomer one or more species of lactides, as represented by lactide which is a dimer of lactic acid, and lactones (e.g., caprolactone, beta-propiolactone, beta-butyrolactone).

Incidentally, the melting point (Tm) of polyglycolic acid resin is generally 200° C. or higher. For example, polyglycolic acid has a melting point of about 220° C., a glass transition temperature of about 38° C., and a crystallization temperature of about 90° C. However, the melting point of the polyglycolic acid resin can vary to some extent depending on the molecular weight thereof, comonomer species, etc.

Although the downhole tool member of the present invention includes a matrix resin which is usually composed of the polyglycolic acid resin alone, it is also possible to use a blend with another thermoplastic resin, such as another aliphatic polyester, an aromatic polyester, or an elastomer, for the purpose of controlling the degradability, etc. However, the blending amount thereof should be suppressed in amount not obstructing the presence of the polyglycolic acid resin as the matrix resin, i.e., less than 30 wt. %, preferably less than 20 wt. %, more preferably less than 10 wt. %, of the polyglycolic acid resin.

(Short Fiber Reinforcement Material)

The downhole tool member of the present invention is obtained by shaping of the aliphatic polyester resin which has been blended with a short fiber reinforcement material. The short fiber reinforcement material may comprise an inorganic or organic fiber reinforcement material, such as glass fiber, carbon fiber, boron fiber, aramid fiber, liquid crystal polymer fiber, and cellulosic fiber (e.g., Kenaf fiber). Among these fiber reinforcement materials, it is preferred to use one that has a shorter-axis diameter (D) of 0.1-1000 μm, more preferably 1-100 μm, particularly preferably 5-20 μm, and an aspect ratio (L/D) of 2-1000, more preferably 3-300, particularly preferably 3-150, and that is usually called a milled fiber or a chopped fiber. A shorter diameter (D) of less than 0.1 μm is liable to fail in providing a sufficient strength for delaying the collapse and a shorter-axis diameter in excess of 1000 μm is liable to result in non-uniform collapse behavior of the shaped body. An aspect ratio (L/D) of less than 2 fails in providing the effect of collapse delay, and in excess of 1000, it becomes difficult to uniformly disperse the short fiber reinforcement material uniformly by melt-kneading.

According to the knowledge of the present inventors, there has been observed a tendency that a larger aspect ratio (L/D) results in an increased initial suppression period of thickness reduction rate (as shown in Examples 1-3 and FIG. 5 described later), whereby it is possible to control, i.e., increase or decrease, the initial suppression period of thickness reduction rate, to some extent.

The suppression effect of thickness reduction rate of a polyglycolic-acid-resin shaped body by incorporation of a short fiber reinforcement material can be attained by blending a short fiber reinforcement material as it is with the polyglycolic acid resin. For the purpose of improving the handleability of the reinforcing material and the purpose of raising the mechanical strength of the resultant downhole tool member, for example, it is also desirable to use the fiber reinforcement material after sizing or binding it with one or more species of sizing (or binding) agents selected from, e.g., epoxy resins, urethane resins, acrylate resins, silane coupling agents, and vinyl acetate resins. (The sizing of short fiber reinforcement material before incorporation thereof into the polyglycolic acid resin is effective for enhancing the dispersibility of the fiber reinforcement material to improve the properties of the polyglycolic-acid-resin shaped body. It has been confirmed by microscopic observation that the reinforcing fibers are dispersed substantially as individual fibers in the resultant polyglycolic-acid-resin shaped body in many cases. Therefore, the diameter of an individual fiber material is used as the shorter diameter D for calculation of the aspect ratio (L/D) influencing the blending effect of the short fiber reinforcement material, even in the case where the fiber reinforcement material is added after the sizing.) Among the sizing agents, it is especially desirable to use an epoxy resin sizing agent alone or a mixture thereof with another sizing agent from the viewpoints of reinforcing effect and molecular weight-retaining effect of the matrix polyglycolic acid resin. Examples of particularly preferred combinations may include a combination of glass fiber and an epoxy resin sizing agent, and a combination of carbon fiber and an epoxy resin sizing agent. When used, the sizing agent may preferably be used in 0.1 to 10.0 wt. %, more preferably 0.3 to 5.0 wt. %, of the sized short fiber reinforcement material as a whole.

The short fiber reinforcement material may preferably be incorporated at a rate of 1-50 wt. parts, more preferably 5-45 wt. parts, particularly preferably 10-40 wt. parts, per 100 wt. parts of polyglycolic acid resin. Less than 1 wt. part fails in developing a sufficient strength for delaying the collapse, and in excess of 50 wt. parts, the uniform dispersion through melt-kneading of the short fiber reinforcement material is liable to be difficult. If the incorporation amount of the short-fiber-reinforcement-material is increased within the above-mentioned range, there is observed a tendency that the initial suppression period of thickness reduction rate is increased, so that in combination with the above-mentioned aspect ratio, it becomes possible to control, i.e., increase or decrease the initial suppression period of thickness reduction rate.

More specifically, by controlling the matrix resin composition principally comprising the polyglycolic acid resin, and the shorter axis, the aspect ratio and the incorporated amount of the short fiber reinforcement material to be incorporated, etc., the downhole tool member of the present invention, when held in water at 120° C., is caused to have thickness reduction characteristics, inclusive of an initial thickness reduction rate which is at most 0.8 times, preferably at most 0.5 times, particularly preferably 0.3 or less times, the initial thickness reduction rate of the shaped body of polyglycolic acid resin alone; a terminal thickness reduction rate which is larger than 1.5 times, preferably at least 4.0 times, particularly preferably 8.0 or more times, the initial thickness reduction rate; and an initial suppression period of thickness reduction rate of preferably at least 1.0 hour, more preferably at least 3 hours, further preferably 5 or more hours. However, the above-mentioned characteristic values are values obtained under the immersion conditions of 120° C. in water as a basis, and can remarkably change with changes in actual work environment conditions as represented by a different temperature condition.

To the polyglycolic acid resin, in addition to the short fiber reinforcement material, it is further possible to add various additives, such as thermal stabilizer, light stabilizer, plasticizer, desiccant, waterproofing agent, water repellent, and lubricant, as needed, within an extent not adverse to the object of the present invention.

The polyglycolic acid resin blended with the above mentioned inorganic or organic short fiber reinforcement material (and other optional components) obtained in the above-described manner may preferably be formed, by a conventional thermoforming method, such as injection molding, melt-extrusion, solidification extrusion, compression molding and centrifugal molding, or if needed, further by cutting, into the shape of a member or article constituting the whole or a component of various downhole tools, such as frac plugs, bridge plugs, cement retainers, perforation guns, ball sealers, sealing plugs, and packers, as exemplified in the above-mentioned Patent documents 1-5.

(Effective Thickness)

The effective thickness of the shaped body of an aliphatic polyester resin blended with an inorganic or organic short fiber reinforcement material and forming a downhole tool member is defined as a reduction thickness which is allowed to be lost by the time when the required characteristics (e.g., a bonding strength for a connecting member and a plugging or sealing function for a plug or a sealer) of the downhole tool member. In case where only one major surface of the tool member is exposed to an aqueous medium forming the operation environment (for example, when the other surface of the two major surfaces is joined to a non-degradable component or a case of a spherical member, etc.), the effective thickness and thickness reduction rate may be determined based on the thickness (or radius) from the one surface. The effective thickness of a tool member-forming shaped body may generally be chosen from the range of 1-1000 mm, especially 2-500 mm, while it can vary remarkably depending on the shape or manner of use of the tool member.

The downhole tool member of the present invention is formed in an effective thickness which is designed to be spontaneously degraded after being used in an environmental aqueous medium at a prescribed temperature of, e.g., 20-180° C., for operations, such as formation, repair and enlargement of downholes. It is also possible, however, to accelerate the collapse thereof after use, as desired, by elevating the environmental temperature, e.g., by injecting hot steam.

EXAMPLES

Hereinafter, the present invention will be described more specifically based on Examples and Comparative Examples. The characteristic values disclosed in this specification including Examples described later are based on values measured according to the following methods.

<Weight-Average Molecular Weight (Mw)>

For measurement of the weight-average molecular weights (Mw) of the polyglycolic acid (PGA) and polylactic acid (PLA), each sample of 10 mg was dissolved in hexafluoroisopropanol (HFIP) containing sodium trifluoroacetate dissolved therein at a concentration of 5 mM to form a solution in 10 mL, which was then filtered through a membrane filter to obtain a sample solution. The sample solution in 10 µL was injected into the gel permeation chromatography (GPC) apparatus to measure the molecular weight under the following conditions. Incidentally, the sample solution was injected into the GPC apparatus within 30 minutes after the dissolution.

<GPC conditions>

Apparatus: Shimadzu LC-9A,

Column: HFIP-806M×2 (series connection)+Pre-column: HFIP-LG×1

Column temperature: 40° C.,

Elution liquid: An HFIP solution containing 5 mM of sodium trifluoroacetate dissolved therein Flow rate: 1 mL/min.

Detector: Differential refractive index meter

Molecular-weight calibration: A calibration curve was prepared by using five standard molecular weight samples of polymethyl methacrylate having different molecular weights (made by POLYMER LABORATORIES Ltd.) and used for determining the molecular weights.

<Shorter-Axis Diameter (D) and Aspect Ratio (L/D) of Short Fiber Reinforcement Material>

In order to measure an aspect ratio (L/D) of glass fiber or carbon fiber which is liable to be cut during compounding into pellets used in Examples, etc. described later, the pellets produced by compounding were subjected to ashing at 700° C. in order to remove only the resin of the pellets to recover only the fiber. One hundred views of electron microscope photograph of the obtained fiber were taken, and number-average values of the shorter-axis diameter and length of the fiber were obtained. The obtained average length (L) was divided by the average shorter-axis diameter (D), to obtain an aspect ratio (L/D) of the fiber in a molded piece. About the shorter-axis diameter (D) and aspect ratio (L/D) of other short fibers (a milled fiber and an aramid fiber) which are not cut easily during compounding, the nominal values before use given by the makers were used as they were.

<Reduction Thickness Measurement>
<Preparation of Molded Pieces>

Molded pieces for measurement of thickness reduction rate by immersion in water were prepared in the following manner from pelletized samples of resin (compositions) of Examples and Comparative Examples described later.

A 5-mm-thick resin sheet was first produced by press molding of pelletized samples by using a mold frame of stainless steel measuring 5 cm-square bottom and 5 mm in depth. The press conditions included a temperature of 260° C., preheating for 4 minutes, pressing at 5 MPa for 2 minutes, and the sheet after the press was quenched by water-cooled plates. Subsequently, several produced sheets were piled up and subjected to press molding, to form a molded piece of a predetermined thickness (12 mm or 23 mm). The press conditions included a temperature of 260° C., preheating for 7 minutes, pressing at 5 MPa for 3 minutes, and the sheet after the press was quenched by water-cooled plates. The thus-produced molded pieces were crystallized by heat treatment in an oven at 120° C. for 1 hour, and then used for the test.

(In-Water Decomposition Test)

Figure 3:
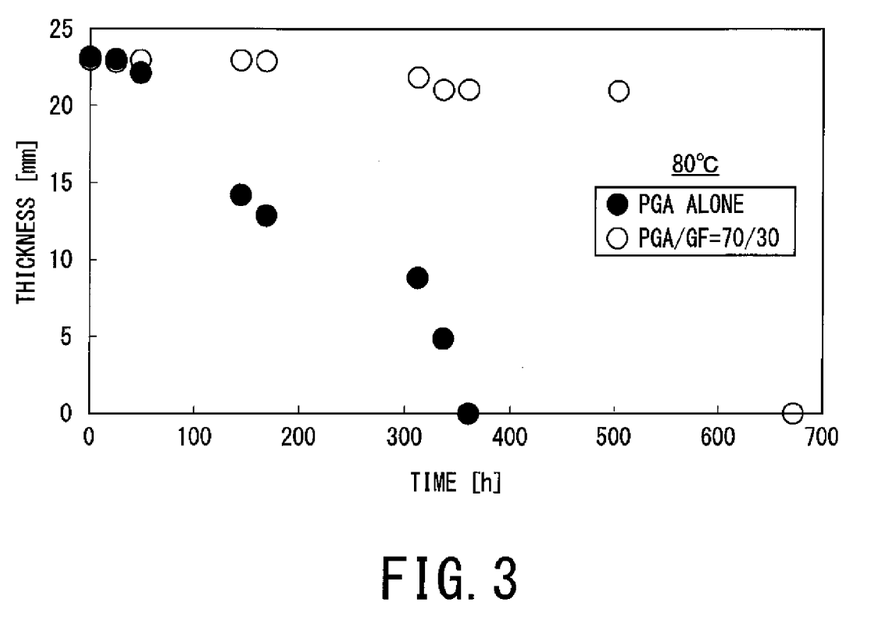
FIG. 3 is a graph showing thickness change with time of during in-water decomposition test at 80° C. of molded pieces of PGA alone and glass fiber-incorporated PGA.
Figure 4:
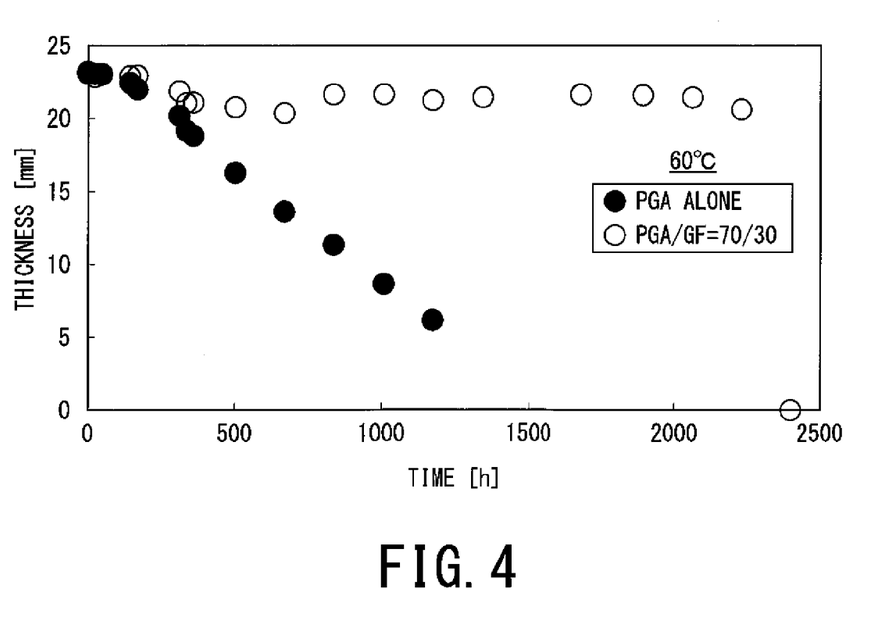
FIG. 4 is a graph showing thickness change with time of during in-water decomposition test at 60° C. of molded pieces of PGA alone and glass fiber-incorporated PGA.

One of the molded resin pieces of obtained as described above was put in a 1 liter-autoclave, which was then filled with de-ionized water, to effect an immersion test for a prescribed time at a prescribed temperature. Then, the molded piece after the immersion was taken out and cut out to expose a section thereof, followed by standing overnight in a dry room to provide a dry piece. The thickness of the core part (hard portion) thereof was measured, and based on a difference from the initial thickness, a reduced thickness was calculated. Changes in reduction thickness with time were obtained based on the values of the reduction thickness measured at various immersion periods of time at a fixed temperature by using plural molded pieces. For example, PGA/GF (glass fiber) (=70/30) compound pellets of Example 1 and pellets of PGA alone of Comparative Example 1, described later, were used for providing molded pieces in the above-described manner, and the reduction thickness changes with time in the in-water decomposition test (120° C., 80° C., and 60° C.) were measured and are respectively shown in FIGS. 2-4.

<Initial Thickness Reduction Rate>

Figure 2:
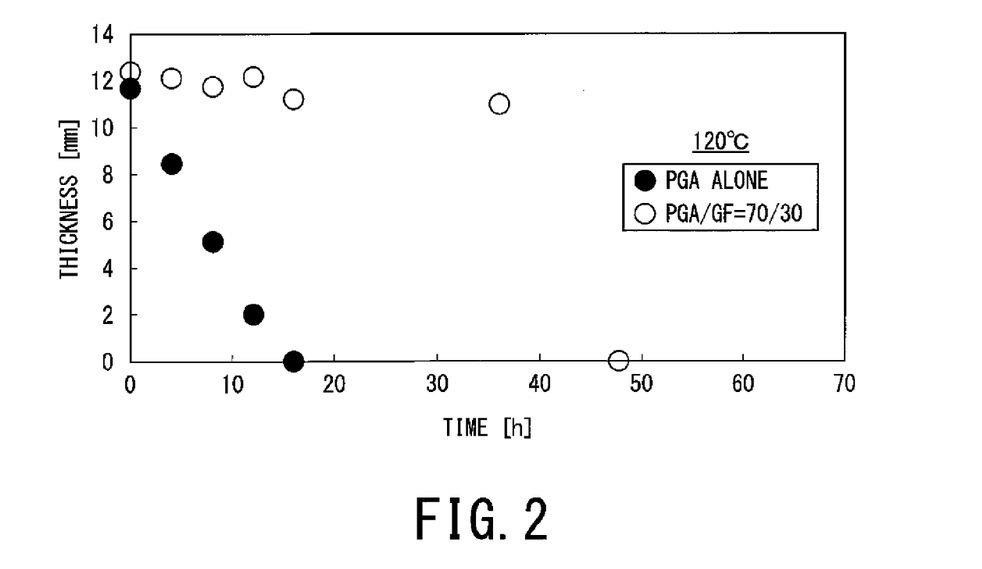
FIG. 2 is a graph showing thickness change with time of during in-water decomposition test at 120° C. of molded pieces of PGA alone (Comparative Example 1) and glass fiber-incorporated PGA (Example 1).

With reference to FIG. 2 showing a 120° C. in-water decomposition test results, for example, compared with the initial thickness reduction rate (average of initial 4 hours) (=0.36 mm/h, on one-side basis) of the molded pieces of PGA alone denoted by black circles, the initial thickness reduction rate (=0.04 mm/h) of the PGA/GF compound molded piece denoted by white circles became about 0.11 times, so that a remarkable suppression of initial thickness reduction rate by incorporation of glass fiber (GF) is observed.

<Terminal Thickness Reduction Rate>

With reference to FIG. 2 again, the test piece up to after about 36 hours of immersion in water were in a solid state allowing a thickness measurement, and the linearity of thickness reduction rate was also good, so that it is considered that the initial suppression period of thickness reduction rate continued until this point of time. Therefore, a terminal thickness reduction rate (per one side) can be assumed to be at least a value obtained by dividing a half of the residual thickness t at this point with a lapsed time (=X−36=Y=12 h) from this point to a point of time X (=about 48 hours) when the residue of solid piece was not observed, i.e., (t/Y)=11/2/12=0.46 mm/h or more. Accordingly, the ratio of terminal thickness reduction rate/initial thickness reduction rate can be calculated at 0.46/0.04=11.5>1.5, thus satisfying the requirement of the invention.

Hereinafter, Examples of preparation of various pellets for the above-mentioned in-water decomposition test are described.

Example 1

Compounding Conditions

PGA alone (Mw (weight average molecular weight)=200,000, made by Kureha Corp.) and glass fiber (GF) bound with a mixture of urethane resin and epoxy resin ("GL-HF", made by Owens Corning Co.; shorter-axis diameter: 10 μm and fiber length: 3 mm) were supplied in a weight ratio of 70/30 by a feeder to a twin-screw extruder ("2D25S", made by Toyo Seiki Seisakusyo, Ltd.) and extruded through a screw with a full-flight structure at an extrusion temperature of 250° C. to prepare pellets (diameter: about 3 mm, length: about 3 mm) through a pelletizer. As a result, compound pellets containing GF short fiber with an aspect ratio of 33 were obtained. The molecular weight of the compound pellets was measured at 180,000.

Example 2

Pellets were prepared in the same manner as in Example 1 except for changing the screw structure of the twin-screw extruder so as to apply a shearing force during kneading, followed by extrusion. The pellets were found to contain GF fiber with an aspect ratio of 18.

Example 3

Pellets were prepared in the same manner as in Example 1 except for using milled glass fiber ("EFH50-31", made by Central Glass CO., Ltd.; shorter-axis diameter: 11 μm and fiber length: 50 μm) as the glass fiber (GF). The aspect ratio of the GF short fiber was calculated at 4 from the maker's nominal values.

Example 4

Pellets were prepared in the same manner as in Example 1 except for changing the weight ratio of PGA and the glass fiber to 90/10.

Example 5

Pellets were prepared in the same manner as in Example 1 except for using the milled glass fiber used in Example 3 and changing the weight ratio to 90/10.

Example 6

Pellets were prepared in the same manner as in Example 1 except for using carbon fiber ("CFEPU-HC", made by Nippon Polymer Sangyo K.K.; shorter-axis diameter: 6 µm, length: 3 mm) as the reinforcement material. The aspect ratio of the carbon fiber was 32.

Example 7

Pellets were prepared in the same manner as in Example 1 except for using aramid fiber ("TECNORA", made by Teijin Co.; shorter-axis diameter: 12 µm, length: 3 mm) as the reinforcement material. The aspect ratio was calculated at 250 from the maker's nominal values.

Example 8

Example 1 was repeated except for changing the reinforcement material to glass fiber (GF) bound with epoxy resin ("03JAFT592S", made by Owens Corning Co.; shorter-axis diameter: 10 µm and fiber length: 3 mm). As a result, compound pellets containing GF short fiber with an aspect ratio of 35 were obtained. The molecular weight of the compound pellets was measured at 200,000.

Example 9

Example 1 was repeated except for changing the reinforcement material to glass fiber (GF) bound with urethane resin ("03JAFT692", made by Owens Corning Co.; shorter-axis diameter: 10 µm and fiber length: 3 mm). As a result, compound pellets containing GF short fiber with an aspect ratio of 32 were obtained. The molecular weight of the compound pellets was measured at 170,000.

Comparative Example 1

The PGA pellets used in Example 1 were used as they were, without blending a reinforcement material.

Comparative Example 2

Pellets were prepared in the same manner as in Example 1 except for changing the reinforcement material to talc and changing the weight ratio to 50/50.

Comparative Example 3

Pellets were prepared in the same manner as in Example 1 except for changing the reinforcement material to silica sand and changing the weight ratio to 50/50.

Comparative Example 4

Pellets were prepared in the same manner as in Example 1 except for changing the matrix material to crystalline polylactic acid (PLLA, "4032D". made by Nature Works LLC; Mw=260,000, melting point: 170° C.).

Comparative Example 5

The PLLA pellets used in Comparative Example 4 were used as they were, without blending the reinforcement material.

<In-Water Decomposition Test>

The pellets obtained in the above-described Examples and Comparative Examples were used in the above-described in-water decomposition test at 120° C. in the above-described manner for measurement of thickness reduction velocity. The results are collectively shown in the following Table 1.

TABLE 1

| Example | Base resin | Reinforcement | Diameter (µm) | Aspect ratio | Blend ratio | Pellet Mw | Thickness reduction rate Initial With Reinforcement. (mm/h) | Base resin alone (mm/h) | Ratio (—) | Terminal (mm/h) | Terminal/ Initial ratio (—) | Initial suppression period of thickness reduction rate (h) |
|---|---|---|---|---|---|---|---|---|---|---|---|---|
| 1 | PGA | Glass fiber | 10 | 33 | 70/30 | 180,000 | 0.04 | 0.36 | 0.11 | 0.46 | 11.5 | 36 |
| 2 | PGA | Glass fiber | 10 | 18 | 70/30 | — | 0.05 | 0.36 | 0.14 | 0.48 | 9.6 | 6 |
| 3 | PGA | Glass fiber | 11 | 4 | 70/30 | — | 0.04 | 0.36 | 0.11 | 0.40 | 10.0 | 4 |
| 4 | PGA | Glass fiber | 10 | 33 | 90/10 | — | 0.01 | 0.36 | 0.03 | ND* | ND* | ND* |
| 5 | PGA | Glass fiber | 11 | 4 | 90/10 | — | 0.24 | 0.36 | 0.67 | 0.42 | 1.8 | 2 |
| 6 | PGA | Carbon fiber | 6 | 32 | 70/30 | — | 0.02 | 0.36 | 0.06 | ND* | ND* | ND* |
| 7 | PGA | Aramid fiber | 12 | 250 | 90/10 | — | 0.01 | 0.36 | 0.03 | ND* | ND* | ND* |
| 8 | PGA | Glass fiber | 10 | 35 | 70/30 | 200,000 | 0.04 | 0.36 | 0.11 | 0.48 | 12.0 | 36 |
| 9 | PGA | Glass fiber | 10 | 32 | 70/30 | 170,000 | 0.04 | 0.36 | 0.11 | 0.46 | 11.5 | 36 |
| Comparative 1 | PGA | — | — | — | 100/0 | 200,000 | — | 0.36 | — | 0.36 | 1.0 | 0 |
| Comparative 2 | PGA | Talc | — | — | 50/50 | — | 0.45 | 0.36 | 1.25 | 0.45 | 1.0 | 0 |
| Comparative 3 | PGA | Silica sand | — | — | 50/50 | — | 0.45 | 0.36 | 1.25 | 0.45 | 1.0 | 0 |

TABLE 1-continued

| Example | Base resin | Reinforcement | Diameter (μm) | Aspect ratio | Blend ratio | Pellet Mw | With Reinforcement (mm/h) | Base resin alone (mm/h) | Ratio (—) | Terminal (mm/h) | Terminal/Initial ratio (—) | Initial suppression period of thickness reduction rate (h) |
|---|---|---|---|---|---|---|---|---|---|---|---|---|
| | | | | | | | Initial | Initial | | | | |
| Comparative 4 | PLLA | Glass fiber | 10 | 33 | 70/30 | — | 0.03 | 0.02 | 1.50 | ND* | ND* | ND* |
| Comparative 5 | PLLA | — | — | — | 100/0 | — | — | 0.02 | — | 0.74 | 37.0 | Nonlinear |

*ND means "not measured".

Moreover, the molded pieces of the pellets of Example 1 and Comparative Example 1, were subjected to the in-water decomposition test also at 80° C. and 60° C., in addition to the in water decomposition test at 120° C. The resultant data of thickness change with time are respectively shown in FIGS. 2-4.

Figure 5:
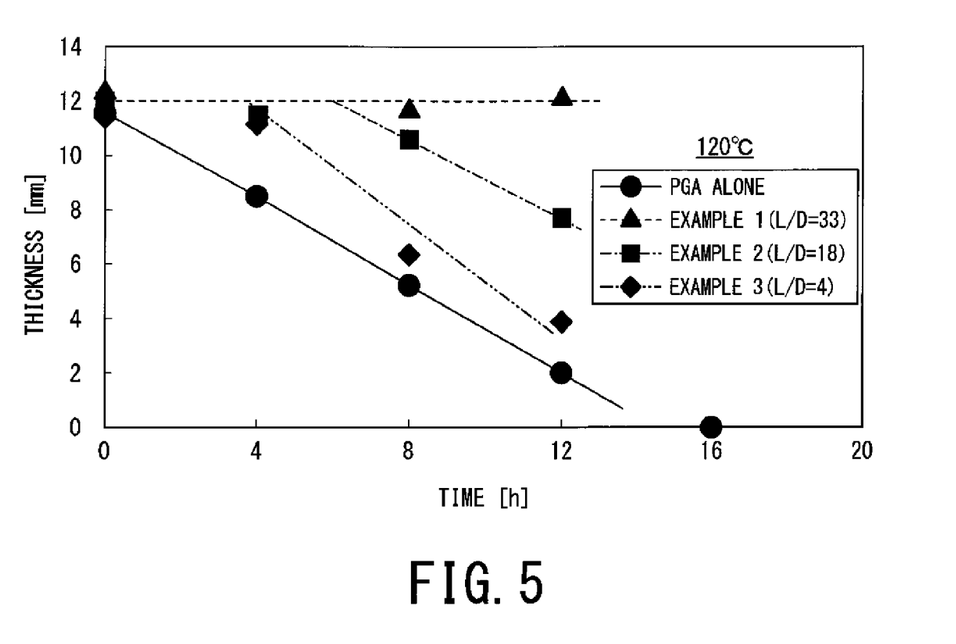
FIG. 5 is a graph showing a change in suppression period of initial thickness reduction rate at 120° C. during in-water immersion of glass fiber-incorporated shaped body depending on a difference in aspect ratio (L/D) of the glass fibers.

Furthermore, the thickness change with time by the in-water decomposition test at 120° C. was similarly measured with respect to the pellets of Examples 2 and 3 containing the glass fibers with aspect ratios which were different from Example 1. The results are shown in FIG. 5 together with the result of Example 1. It is understood that even the shaped products containing similar glass fibers result in remarkably different initial periods of suppressing thickness reduction rates owing to different aspect ratios. Moreover, from a comparison of Comparative example 4 and Example 1 in Table 1, it is noted that the effect of suppressing the thickness reduction rate by incorporation of reinforcing fiber attained by the down hole tool member of the present invention was not essentially attained by Comparative example 4 using PLLA resin instead of PGA resin as the matrix (base) resin.

INDUSTRIAL APPLICABILITY

As described above, according to the present invention, there is provided a downhole tool member, that is a tool for formation or repair of downholes for recovery of hydrocarbon resources including oil and gas, or a part of the tool, which is capable of suppressing collapse in an initial period and allowing a rapid collapse in a terminal period and is particularly suitable as a packing or sealing member.

The invention claimed is:

1. A downhole tool member for hydrocarbon resource recovery, comprising:
a shaped body comprising a polyglycolic acid resin matrix including an inorganic or organic short fiber reinforcement material,
wherein:
the downhole tool member, when held in water at 120° C., has the following thickness reduction characteristics:
an initial thickness reduction rate (as an average for a holding period of 4 hours) which is at most 0.8 times that of a shaped body of the polyglycolic acid resin alone, and
a terminal thickness reduction rate (after the thickness decreases to 50% or less of an initial thickness) which is larger than 1.5 times the initial thickness reduction rate.

2. A downhole tool member according to claim 1, wherein the initial thickness reduction rate is at most 0.3 times that of the initial thickness reduction rate of the shaped body of the glycolic acid resin alone and the terminal thickness reduction rate is at least 8.0 times the initial thickness reduction rate.

3. A downhole tool member according to claim 2, wherein the short fiber reinforcement material has a shorter-axis diameter (D) of 0.1-1000 μm and an aspect ratio (L/D) of 2-1000.

4. A downhole tool member according to claim 2, wherein the short fiber reinforcement material comprises glass fiber, carbon fiber or aramid fiber.

5. A downhole tool member according to claim 2, wherein the short fiber reinforcement material has been bound with a sizing agent.

6. A downhole tool member according to claim 5, wherein the sizing agent comprises an epoxy resin.

7. A downhole tool member according to claim 6, wherein the short fiber reinforcement material comprises glass fiber, carbon fiber or aramid fiber.

8. A downhole tool member according to claim 1, wherein the short fiber reinforcement material has a shorter-axis diameter (D) of 0.1-1000 μm and an aspect ratio (L/D) of 2-1000.

9. A downhole tool member according to claim 1, wherein the short fiber reinforcement material comprises glass fiber, carbon fiber or aramid fiber.

10. A downhole tool member according to claim 1, wherein the short fiber reinforcement material has been bound with a sizing agent.

11. A downhole tool member according to claim 10, wherein the sizing agent comprises an epoxy resin.

12. A downhole tool member according to claim 11, wherein the short fiber reinforcement material comprises glass fiber, carbon fiber or aramid fiber bound with an epoxy resin sizing agent.

13. A downhole tool adapted for hydrocarbon resource recovery, wherein the downhole tool comprises the downhole tool member according to claim 1.

14. A downhole tool according to claim 13, wherein the downhole tool is selected from the group consisting of frac plugs, disintegratable plugs, bridge plugs, cement retainers, perforation guns, ball sealers, sealing plugs, and packers.

* * * * *